United States Patent

Eberts

[15] 3,653,850
[45] Apr. 4, 1972

[54] PROCESS FOR PURIFYING TANTALUM FLUORIDE SALTS

[72] Inventor: Robert E. Eberts, Framingham, Mass.
[73] Assignee: Norton Company, Worcester, Mass.
[22] Filed: Apr. 14, 1969
[21] Appl. No.: 815,972

[52] U.S. Cl..............................23/312 ME, 23/312 R, 23/88
[51] Int. Cl..................B01d 11/02, C01d 3/18, C01g 35/00
[58] Field of Search.............................23/312 ME, 312 R, 88

[56] References Cited

UNITED STATES PATENTS

| | | | |
|---|---|---|---|
| 2,767,047 | 10/1956 | Wilhelm | 23/312 ME |
| 2,812,232 | 11/1957 | Delaplaine | 23/312 ME |
| 3,062,613 | 11/1962 | Pilloton | 23/312 ME |
| 3,065,046 | 11/1962 | Foos | 23/312 ME |
| 3,112,991 | 12/1963 | Fisher | 23/312 ME |
| 3,117,833 | 1/1964 | Pierret | 23/312 ME |
| 3,268,302 | 8/1966 | Renner | 23/312 ME |
| 3,403,983 | 10/1968 | Gerfen | 23/312 ME |

FOREIGN PATENTS OR APPLICATIONS 696,821  10/1964  Canada............................23/312 ME

OTHER PUBLICATIONS

West, Metallurgia, pages 292– 294, June, 1956

Primary Examiner—Norman Yudkoff
Assistant Examiner—S. J. Emery
Attorney—Oliver W. Hayes and Jerry Cohen

[57] ABSTRACT

Process for purifying tantalum fluoride double salts, e.g. $K_2TaF_7$, of other metallic impurities. By proper adjustment of an aqueous acid phase, the tantalum values of such relatively insoluble salts can be directly transferred to an organic extractant phase. Pure tantalum compounds can be recovered from the extract.

5 Claims, 2 Drawing Figures

Patented April 4, 1972 3,653,850

INVENTOR.

BY

ATTORNEY

PROCESS FOR PURIFYING TANTALUM FLUORIDE SALTS

The most useful of all tantalum salts are the alkali fluotantalates, e.g. $K_2TaF_7$, $Na_2TaF_7$, $Na_3TaF_8$. These are sources of pure tantalum metal, obtained by electrolytic or chemical reduction of the salt, and used for many structural and electrical products. Analogous salts of niobium are similarly useful. A number of processes are used for the purification of tantalum from its ores, for its separation from niobium, and for its recovery as alkali fluotantalate, e.g. $K_2TaF_7$. As a first step in many such processes, the tantalum values must be placed in a fluoride containing solution. The utility of the potassium fluotantalate is its ease of recovery because of its very low solubility. However, if such a fluoride salt is contaminated, due to low grade starting materials, faulty purification during salt preparation or due to later contamination or when the salt itself is a byproduct of incomplete reduction (electrolytic or chemical) and cleaning of tantalum metal, the salt can be purified (or repurified) only by long laborious and costly means.

The principal object of the present invention is to treat impure tantalum fluoride salts by a direct process to recover a pure tantalum product.

It is the object of this invention to circumvent the long, multistep process to purify such salts.

Another object is to provide a simple one-step process for obtaining pure tantalum values from impure tantalum fluoride salts.

Another object of this invention is to handle any common tantalum double salt or mixture of such double salts.

A further object of this invention is to provide a solvent extraction process for directly purifying such tantalum fluoride salts.

A further object of this invention is to provide a method which allows purifying such salts in a continuous process.

These and other objects, features and advantages of the invention will in part be obvious and will in part appear hereinafter. For a more full understanding of the nature of the invention, reference should be made to the following detailed description and including the accompanying drawings wherein.

Figure 1:
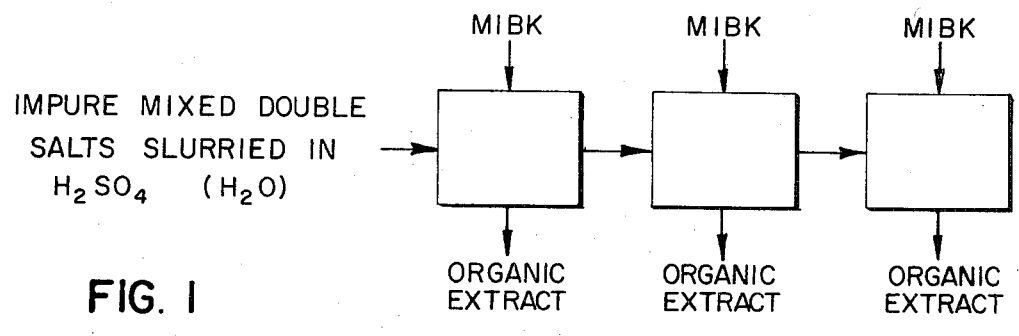
FIG. 1 is a schematic diagram of cross-current extraction process.

The previous method of purifying an impure alkali fluotantalate was to first dissolve the salt in water or dilute acid. Due to the limited solubility of such salts, large solution volumes are required. The tantalum was then precipitated as the hydroxide by addition of alkali. This co-precipitates many of the impurities present. Also, as a hydrous, gelatinous, fine precipitate, the hydroxide was difficult to filter, the cake was only rinsed free of the mother liquor with great difficulty. Reslurrying of the cake leads to peptization and loss of product as the mother liquor is removed from the precipitate. The cake obtained was likewise difficult to dewater. The dewatering step was of importance since the tantalum solution obtained in the next step would then be too dilute for economical use. The hydroxide cake was then dissolved by addition of hydrofluoric acid. This step required considerable care due to the release of heat during the neutralization-dissolution. The resulting tantalum fluoride solution was adjusted as to concentration and acidity. And this solution was subjected to a liquid-liquid extraction-purification operation utilizing an organic ketone extractant similar to that used for purifying tantalum solutions which are obtained from ore. In the final steps, the tantalum was recovered from the organic ketone extractant and crystallized as the tantalum double salt, usually as $K_2TaF_7$.

It is known that $K_2TaF_7$ can be directly crystallized from the organic extract by the addition of a suitable akali-halide salt, e.g. potassium bifluoride. It appears that sodium double salts can be obtained similarly.

In the present invention it is shown that under certain conditions, which have been discovered, the tantalum fluoride value of double salts can be directly extracted into an organic ketone or equivalent organic solvent. That is, instead of crystallizing the fluoride salt from the organic ketone solvent, the tantalum content of salt crystals can be extracted back into the ketone. Depending on the impurities present in the impure salt, this may be the only operation required to purify the tantalum. Pure tantalum double salt can then be immediately recovered from the extract. If the impure tantalum salt contains certain other transition metal impurities, e.g. niobium, the extract will require scrubbing with water or dilute acid to remove these metals from the extract before recovering the tantalum from the extract.

In the present invention, a quantity of impure alkali fluotantalate is slurried with a solution of sulfuric acid. This slurry is then contacted with a water-immiscible, oxygen-containing organic solvent, e.g. diethyl ketone, cyclohexanone, tributyl phosphate, diethyl ether, diisopropyl ether, amyl alcohol, but preferably methyl isobutyl ketone (MIBK). After stirring or mixing, the mixture is allowed to settle into separate phases which will inherently be liquid organic, liquid aqueous, and solid salt respectively. The organic phase is removed and the tantalum recovered by adding an aqueous alkali fluoride solution. The alkali fluotantalate so recovered is found to be purified.

The concentration of the sulfuric acid was varied from 10 to 75 percent. At concentrations over 80% $H_2SO_4$, the acid-organic mixture formed only one phase which was not so desirable. High concentrations of sulfuric acid promoted the extractability of the tantalum. Thus, more tantalum was extracted per contact and the concentration of tantalum in the extract increased.

The weight of the aqueous phase to the weight of tantalum in the double salt was varied from 0.4/1.0 to 2.0/1.0. The lower the amount of MIBK used, the more concentrated was the tantalum in the extract. Depending upon the acid concentration, a minimum amount of MIBK was required in order to extract most of the tantalum in one step.

Since tantalum is of high value, it is desirable to recover as much as possible of the metal. One way of doing this is by running a cross-current extraction, such as an extraction shown schematically in diagrammatic form FIG 1. In such a scheme, the fluoride salt, aqueous acid slurry is repeatedly contacted with organic extract. The actual apparatus used in each stage was a first tank with agitator and a second tank for settling. After mixing acid, salt and MIBK in the first tank, the mixture is poured over into the second tank. There salt settles to the bottom as a solid, covered by an aqueous phase which separates out from an organic phase which floats on top. The organic phase is removed and the salt and aqueous phase and fresh MIBK are fed to the next stage. Other common forms of extraction apparatus may be used. In particular, continuous processing apparatus may be used on a practical basis. My work has shown that such a scheme can be used in the pursuit of this invention.

Another common method of completely extracting one component from another is to make a counter-current extraction. This type process is shown in diagrammatic form in FIG. 2. I have likewise shown the practicality of using this type of process in the practice of the invention. The solid lines indicate transfer of aqueous phase. The dashed lines indicate transfer of organic phase. As shown, each organic charge sees four stages of aqueous phase and salt.

In the pursuit of this invention, I have generally used methyl isobutyl ketone (MIBK) as the organic extractant. Those familiar with the art will know that MIBK is merely typical of many water-immiscible, oxygen-containing organic solvents that may be used.

In the use of this invention sulfric acid is preferred. While other aqueous mineral acid solutions (equivalent to the form of sulfuric acid used here) might be used, sulfuric acid tends to give better phase separation and improves the purification level obtained in the extraction. In any event the acid should be at least two (2.0) normal in hydrogen ion.

In this work samples of the aqueous phase were often taken for analysis. This showed that relatively small amounts of tantalum were ever present in the aqueous phase. Thus, the aqueous acid merely seems to provide a means of transport for the tantalum and a source of hydrogen ions for the tantalum complex which is present in the organic phase.

For a more detailed description of the present invention, references should be made to the following nonlimiting examples:

EXAMPLE 1

Twenty-five grams of $K_2TaF_7$ were mixed with 50 ml. of 50% $H_2SO_4$ (in water). Fifty ml. of MIBK was added and the mixture stirred for about 10 minutes. After settling and separating, the organic (MIBK) phase was decanted off. About 4.0 grams of $Ta_2O_5$ were recovered from the organic phase by precipitation with $NH_4OH$ and firing to the oxide.

EXAMPLE 2

Fifty grams of mixed double salt (an impure mixture of sodium and potassium fluotantalate, containing 42% Ta) were mixed with 90 ml. of 67% $H_2SO_4$. About 60 ml. of MIBK were added and stirred with the mixture. After allowing the phases to separate, the MIBK was decanted off. Analysis showed that 20.7 grams of tantalum had been extracted into the organic phase.

EXAMPLE 3

One hundred grams of the mixed double salt were slurried with about 180 ml. of 28% $H_2SO_4$. About 200 ml. of MIBK was added and the mixture stirred, after the phases separated the MIBK was decanted off. Analysis showed that 13.7 grams of tantalum had been extracted.

EXAMPLE 4

Thirty-five grams of the mixed double salt were slurried with 50% $H_2SO_4$ and then 50 ml. of MIBK were added and the mixture stirred. After settling the MIBK was decanted off, fresh MIBK added and the process repeated. The slurried salt was thus contacted with MIBK five times. The amount of tantalum extracted in each step was 7.2 gm, 5.1 gm, 2.1 gm, 0.4 gm and <0.1 gm. The weight of residue salt was 3.1 grams, but this analyzed to contain less than 0.01 gm tantalum. Thus, all the tantalum had been transferred to the organic phase in this five stage, cross-current extraction.

EXAMPLE 5

Figure 2:
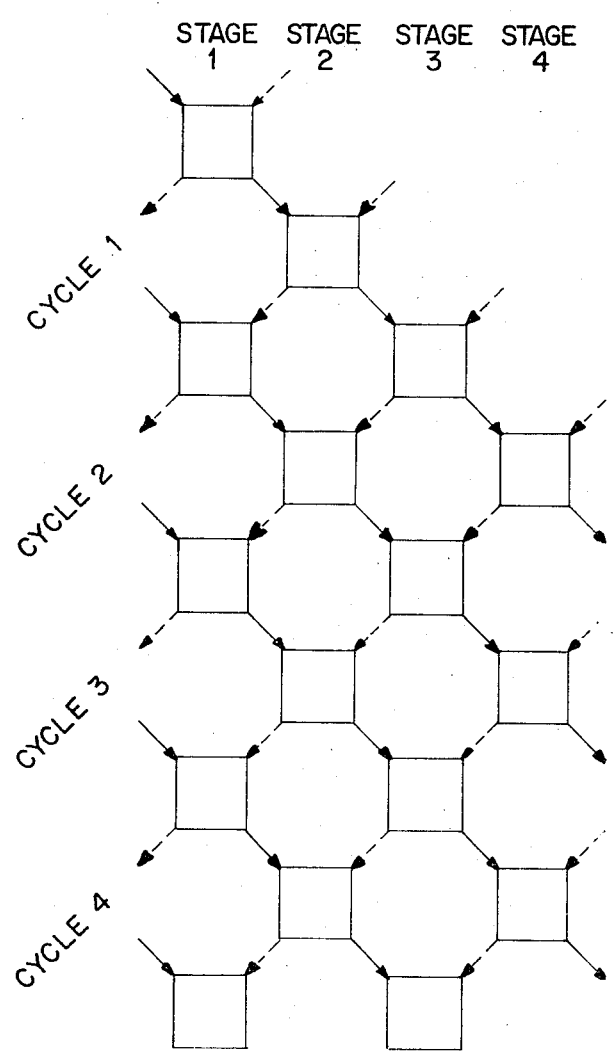
FIG. 2 is a schematic diagram of a counter-current extraction process.

A counter-current extraction was run as shown in FIG. 2. The inputs were: 35 grams of the mixed double salt plus 80 grams of 35% $H_2SO_4$ and 100 ml. of MIBK. Fresh aqueous salt was added at stage 1 on each cycle; fresh organic was added at the highest stage (stage 4 after cycle 1). The results of such an extraction are shown below:

| Cycle No. | Stage 1—Organic Extract (gm Ta/l) | Total Tantalum Extracted (gm) |
|---|---|---|
| 1 | 74 | 8.0 |
| 2 | 94 | 10.2 |
| 3 | 101 | 10.7 |
| 4 | 80 | 8.3 |
| 5 | 103 | 11.0 |
| 6 | 110 | 11.2 |
| 7 | 112 | 12.5 |
| 8 | 115 | 12.5 |

As the system approached equilibrium, 85 percent of the tantalum in the input was being recovered. A greater percentage can be recovered by decreasing the tantalum in the feed (less salt) or by adding one or two more stages.

EXAMPLE 6

As an indication of the purification being obtained on such a system, the analysis of impurities in the mixed double salt input to the extraction of Example 5 and that of the tantalum recovered from the extract are shown below:

|  | Al | Cr | Mg | Nb | Si | Sn | Ti | Fe | Ca |
|---|---|---|---|---|---|---|---|---|---|
| Input mixed double salt | 33 | 250 | 270 | <50 | 590 | <10 | <10 | >1,000 | >500 |
| Output, run 2, cycle 8, stage 1 | <30 | <10 | <40 | <50 | <30 | <10 | <10 | ~10 | ~30 |

The very high purity obtained was not expected and allows the elimination of scrub stages if the product is free of other transition metal impurities.

The above described method for purifying alkali fluotantalates may be applied to purifying corresponding alkali fluoniobates with appropriate precipitating agents in similar fashion. Essentially any source of alkali fluotantalate or alkali fluoniobate can be treated. In particular, leach liquors used to clean the products of salt reduction can be precipitated, centrifuged, dried and contacted with hydrofluoric acid to produce a solid salt product containing about one-third of the total tantalum (or niobium) values of the leach liquor.

Since certain further changes may be made in the above process without departing from the scope of the invention herein involved, it is intended that all matter contained in the above description shall be interpreted as illustrative and not in a limiting sense.

What is claimed is:

1. The process of purifying an impure, substantially insoluble potassium fluotantalate double salt—$K_2TaF_7$—, such as obtained in leach liquors used to clean the products of salt reduction, the process comprising the steps of:
   a. slurrying a solid form of the impure salt with an acid solution comprising 10 to 75 percent concentration of sulfuric acid in water,
   b. extracting tantalum values from the slurry by adding and intimately mixing methyl isobutyl ketone with the slurry of
   a. to cause formation of two phases in the mixture — an organic phase containing tantalum values and an aqueous phase containing impurities from the original impure salt feed, separating the phases and recovering tantalum values from the organic phase.

2. The process of claim 2 wherein the acid used is an aqueous sulfuric acid solution at least 2 normal in hydrogen ion.

3. The process of claim 2 wherein the acid solution is 40–75 percent sulfuric acid in water and wherein the extraction is carried out in a single stage of mixing and phase separation.

4. The process of claim 1 in which the extraction is carried out in a cross-current manner.

5. The process of claim 1 in which the extraction is carried out in a counter-current manner and wherein the solution is 20 to 40 percent sulfuric acid in water.

* * * * *